United States Patent [19]

Yoshinaka et al.

[11] Patent Number: 4,611,250
[45] Date of Patent: Sep. 9, 1986

[54] APPARATUS FOR RECORDING A VIDEO SIGNAL

[75] Inventors: Tadaaki Yoshinaka; Toshiaki Noguchi, both of Kanagawa, Japan

[73] Assignee: Sony Corporation, Tokyo, Japan

[21] Appl. No.: 561,783

[22] Filed: Dec. 15, 1983

[30] Foreign Application Priority Data

Dec. 17, 1982 [JP] Japan .................................. 57-222294

[51] Int. Cl.[4] .............................................. H04N 5/92
[52] U.S. Cl. ..................................... 360/9.1; 360/33.1; 358/335
[58] Field of Search ................. 360/9.1, 37.1, 32, 19.1, 360/33.1, 84; 358/335

[56] References Cited

U.S. PATENT DOCUMENTS

| 3,414,684 | 12/1968 | Lichowsky | 360/84 |
| 3,763,328 | 10/1973 | Lester | 360/8 |
| 4,330,795 | 5/1982 | Foerster | 360/33.1 |
| 4,353,098 | 10/1982 | Heinz | 360/9.1 |
| 4,392,159 | 7/1983 | Lemoine | 360/9.1 |
| 4,468,710 | 8/1984 | Hashimoto | 360/9.1 |
| 4,542,417 | 9/1985 | Ohto | 360/9.1 |

Primary Examiner—Alan Faber
Attorney, Agent, or Firm—Lewis H. Eslinger; Alvin Sinderbrand

[57] ABSTRACT

In an apparatus for recording a video signal on magnetic tape which is helically wrapped on a guide drum having single rotary head for scanning the magnetic tape, one field of the video signal is divided into N segments thereof (where N is an integer) and each of the N segments are time-compressed to ensure a time corresponding to an interval where the single rotary head scans the magnetic tape. The N segments of the video signal are respectively recorded on separate N tracks of the magnetic tape by the single rotary head.

13 Claims, 7 Drawing Figures

FIG. 1
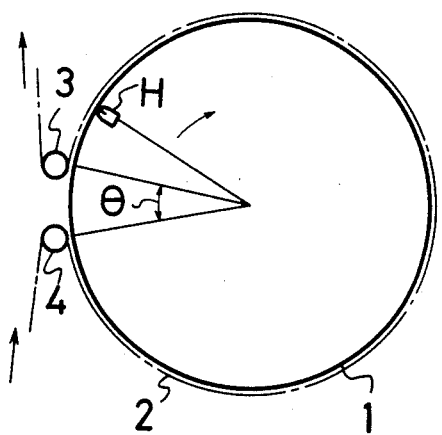
FIG. 2A
FIG. 2B
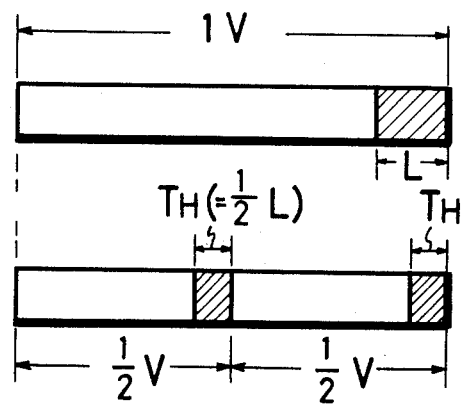

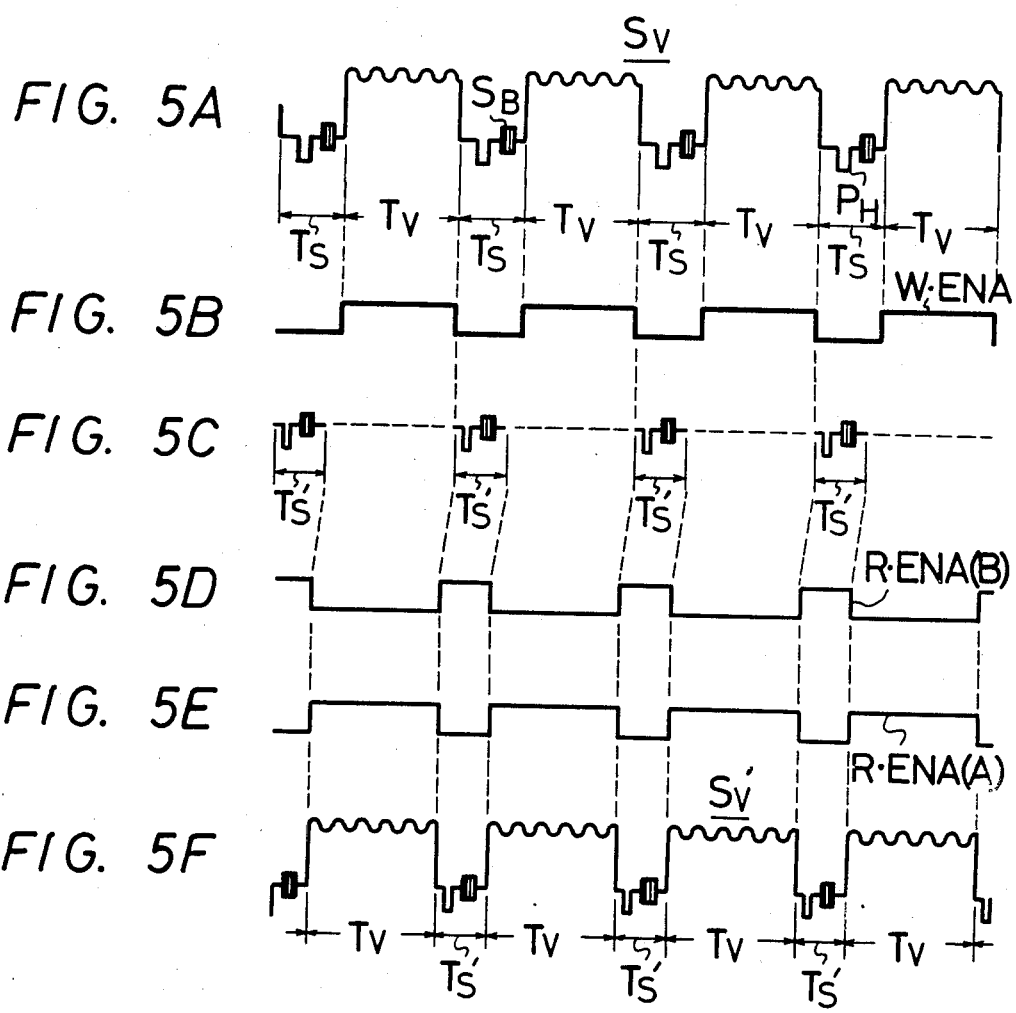

FIG. 6A
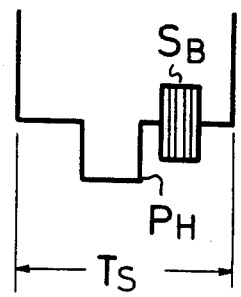
FIG. 6B
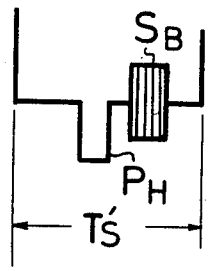
FIG. 6C
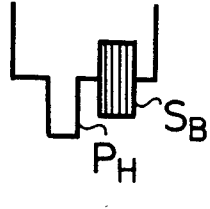
FIG. 7A
FIG. 7B
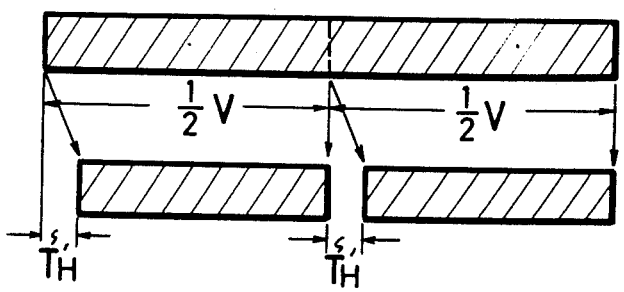

APPARATUS FOR RECORDING A VIDEO SIGNAL

BACKGROUND OF THE INVENTION

This invention relates to a video signal recording apparatus and in particular, is directed to an apparatus for recording segments of one field of video signal on a plurality of tracks, respectively.

In a conventional segment VTR wherein one field of video signal is divided into a plurality of segments and each of the segments is recorded on a plurality of tracks, there is an advantage that even if the diameter of a rotary head drum is made small, a necessary relative speed between the rotary head and a tape can be obtained. On the other hand, in the VTR of helical scanning system, a tape is wound around a rotary drum in an $\Omega$-shape, so that a non-contact interval of the head with the tape occurs several times at each field. Apparently, a drop-out of reproducing signal will appear in the interval. In order to avoid the drop-out of the reproducing signal, it has been proposed in the prior art to employ an head for recording the video signal on the tape during the non-contact interval of the main head. This previously proposed system, however, employs a plurality of heads, so that a difference between the characteristics thereof appears on the picture screen. As a result, it is quite difficult to use the system in practice. When the interval reproduced by the auxiliary head is positioned at the center portion of the picture screen, the scattering or irregularity in the characteristics of the heads seriously affects the picture quality.

In order to prevent the signal from being dropped out with a single head, it is sufficient to record a video signal under the state that the video signal is time-compressed. In this case, however, clock signals having two different frequencies are necessary for time-compressing and/or time-expanding the video signal. As a result, not only the hardware of the apparatus becomes complicated, but also the undesired component caused by the interference between the different clock signals will be mixed into the video signal. Moreover, since the video signal is time-compressed and then recorded, the band of the video signal to be recorded is caused to be widened.

In order to prevent the signal dropout with a single head and without time-compressing the video signal, it may be considered to select a relative relation between the video signal and the rotary head in such a manner that the non-contact interval of the head is positioned in vertical blanking period of the video signal. However, in this case there is another disadvantage that a time code signal inserted into the vertical blanking period may be dropped out.

OBJECTS AND SUMMARY OF THE INVENTION

Accordingly, one object of this invention is to overcome the above-described disadvantages which are present in the conventional VTR.

Another object of this invention is to provide new apparatus for recording a video signal with a single rotary head and without generation of drop-out of the video signal.

In accordance with the present invention, an apparatus for recording a video signal on magnetic tape which is helically wrapped on a guide drum having a single rotary head for scanning successive tracks on the magnetic tape includes means for dividing each field of the video signal into N segments, where N is a positive integer greater than 1, and time-compressing each of the N segments so that each of the segments corresponds to an interval in each resolution of the single rotary head during which it contacts the magnetic tape, and means for recording the N segments sequentially in respective N recording tracks on the magnetic tape by means of the single rotary head.

In accordance with another aspect of the present invention, a video signal recorded on a magnetic tape by means of a single rotary head, as aforesaid, has the compressed segment signals reproduced by the rotary head, and processing means are provided for time-base expanding the compressed segment signals and thereby restoring the video signal.

The above, and other objects, features and advantages of the present invention, will be apparent from the following detailed description read in conjunction with the accompanying drawings.

BRIEF DESCRIPTION OF THE DRAWINGS

One embodiment of the present invention will be hereinafter described in detail with reference to following drawings;

FIG. 1 is a conceptual diagram of a guide drum having a single rotary head which is used for explaining the present invention, FIGS. 2A and 2B are diagrams which are used to explain the operation of this invention, FIGS. 5A–5F, 6A–6C, 7A and 7B are diagrams which are useful in explaining the operation of the present invention during recording.

DETAILED DESCRIPTION OF THE PREFERRED EMBODIMENT

In FIG. 1, a tape 2 is helically wrapped around a rotary drum 1 in $\Omega$-shape. In case that a diameter D of the rotary drum 1 is reduced to the half in comparison with that of the conventional VTR in order to make the recording apparatus compact size, rotating frequency f thereof is raised twice as high as the conventional one to raise up the relative speed between the head and the tape. Accordingly, the video signal of one field is recorded on the tape 2 in sequential two tracks by a single head H. It is noted that this case indicates two-segment recording system.

In this VTR, since the tape 2 is wrapped around the rotary drum 1 in an $\Omega$-shape, the opposing spacing or distance between $\Omega$-shape wrapping tape guides 3 and 4 can not be reduced to zero due to the mechanical restriction, this means that the non-contact interval of the head H with the tape 2 occurs inevitably. In a non-segment recording system in which a video signal of one field is recorded on the tape by one revolution of the head H, a video signal in an interval L shown by a hatched area in FIG. 2A is dropped out or not recorded, while in the above two-segment recording system, a video signal is dropped out during each interval of $\frac{1}{2}$ field as shown by a hatched area in FIG. 2B.

In the two-segment recording system, since the rotating frequency f of the drum 1 is raised twice, each signal dropout interval is equal to $\frac{1}{2}$L. Depending on a tape wrapping angle (360°−¼), the signal dropout interval L is generally about 10H (H represents a horizontal scanning period).

Figure 3:
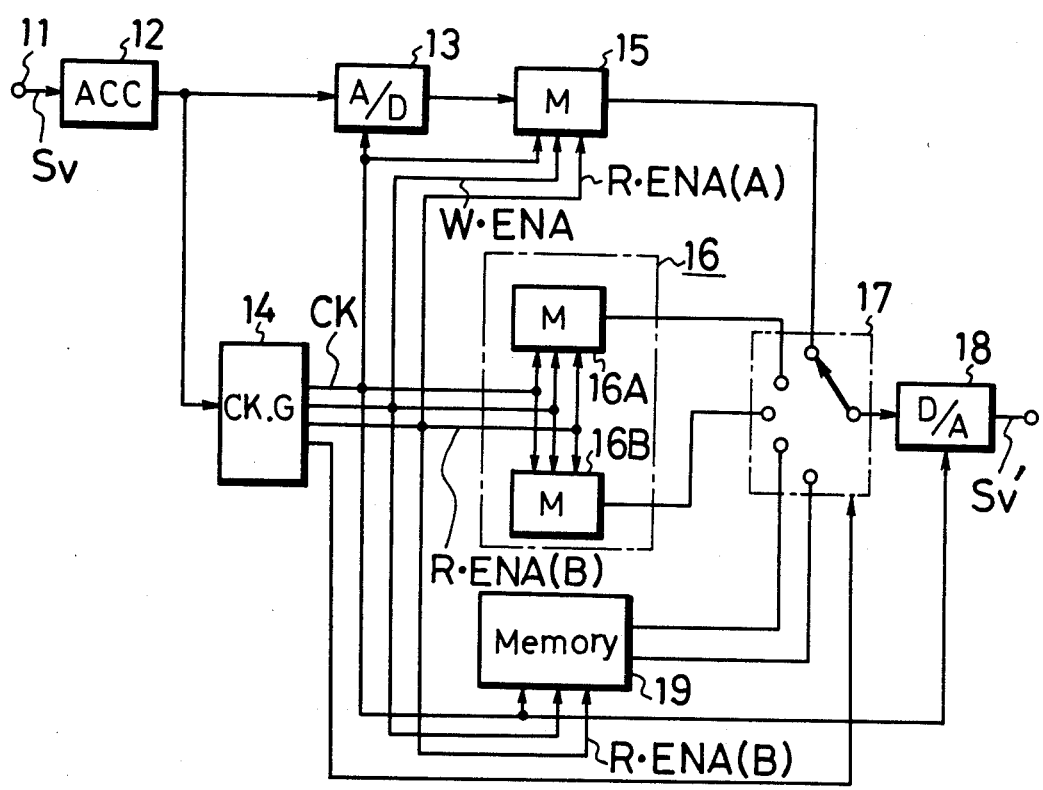
FIG. 3 is a block diagram showing an embodiment of recording apparatus in accordance with this invention.

FIG. 3 shows an embodiment of a recording apparatus 10 according to the present invention. In FIG. 3, a video signal (composite video signal) $S_V$, which is to be recorded, is supplied to a terminal 11 through an ACC (automatic chrominance control) circuit 12 to an A/D (analog-to-digital) converter 13 and a clock generator 14. Then, a clock CK separated from the video signal $S_V$ and synchronized with a synchronizing signal is supplied from the clock generator 14 to the A/D converter 13 in which the video signal $S_V$ is converted in the form of analog to digital signal. The digital video signal $S_V$ converted from analog signal is written in a memory 15. In this invention, only the image portion (interval $T_V$ shown in FIG. 5) of the video signal $S_V$ is written therein. To this end, a write enable pulse W·ENA shown in FIG. 5B is supplied from the clock generator 14 to the memory 15.

The capacity of the memory 15 is different depending on the duration of the signal dropout interval L. If the signal dropout interval L, for example, is equal to about 10H, in the case of two-segment recording system, a signal dropout interval $T_H$ caused during the ½ field period is approximately 5H in two-segment recording system. Accordingly, the length to be compressed during the ½ field period is approximately 5H, so that it is sufficient for the memory 15 to have a capacity of 5 to 7H.

As a signal contained in a horizontal flyback (horizontal blanking) interval $T_S$ of the video signal $S_V$, there is utilized a signal based on the compressed data the timebase of which is compressed. To this end, there is provided a data storing memory 16A such as PROM (programmable read-only memory) and so on in which the signal in the horizontal blanking interval $T_S$ is stored under the state that its timebase is compressed as it is desired. The compressing ratio is different depending on the duration of time of the signal dropout interval. In the above embodiment, if the horizontal blanking interval $T_S$ is compressed by approximately 0.04H, the timebase of the signal can be compressed by approximately 5H during the ½ field (½×262.5H). The compressing amount during one horizontal scanning period is approximately the half of a pulse width of a horizontal synchronizing pulse $P_H$. A burst signal $S_B$ is not compressed in timebase.

During the vertical blanking interval, a compressed data stored in another memory 16B is utilized. While in this embodiment the horizontal synchronizing pulse as well as the vertical synchronizing pulse and so on are compressed in timebase with the same compressing amount as that in the horizontal synchronizing interval, it is possible that during the vertical blanking interval only the horizontal synchronizing pulse is compressed in timebase.

If the timebase of the signal is compressed with the compressing amount exceeding 5H, the signal can be recorded only in the portion where the head H is in good contact with the tape 2. Thus, in practice, it can be considered that the signal is compressed in timebase with a compressing amount further exceeding the above calculated value. In this case, it is sufficient to store in the memory a data in which in addition to the horizontal synchronizing pulse $P_H$ the intervals of the front porch and back porch thereof are respectively compressed in timebase. The example thereof is shown in FIG. 6C.

Accordingly, if read enable pulses R·ENA(A) and R·ENA(B) shown in FIGS. 5D and 5E are supplied from the clock generator 14 to the memories 15 and 16 (16A and 16B) to read out the data therefrom in response to the same clock CK (the clock same as that upon writing), they are extracted through a switching circuit 17 and then converted to an analog signal by a succeeding D/A (digital-to-analog) converter 18, it is possible to obtain a video signal $S_V'$ in which as shown in FIG. 5F at least the horizontal synchronizing interval, or in this embodiment, both the vertical blanking interval and the horizontal synchronizing interval are respectively compressed in timebase with the predetermined compressing ratio.

As a result, after the ½ field period elapses, as shown in FIG. 7, the video signal $S_V'$ is compressed in timebase by an interval $T_H'$. This interval $T_H'$ is equal to or larger than the interval $T_H$ in which the head H is not in contact with the tape 2. Therefore, if the reading of the signal and the rotation of the head H are made in synchronism with each other in such a manner that the compressed interval $T_H'$ may be equal to the interval $T_H$ in which the head H does not contact with the tape 2, even when the segment recording is carried out by the single head H, without dropping out the vertical blanking signal or the like, all the video signal can be recorded by the signal conversion employing the same clock CK.

In FIG. 3, reference numeral 19 designates a memory which stores the compressed data. If, for example, the memory 16 stores therein the compressed data of an even field, the other memory 19 stores therein the compressed data of an odd field.

Figure 4:
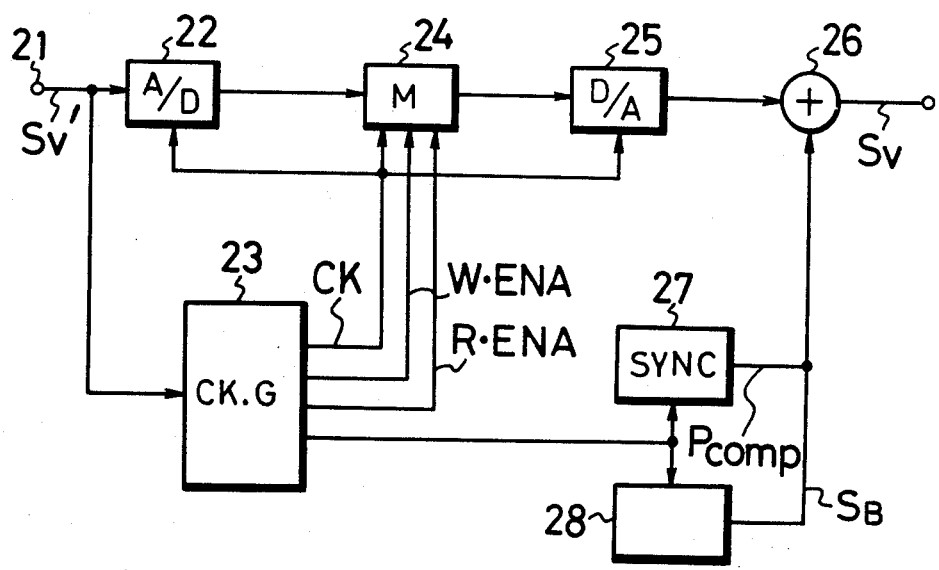
FIG. 4 is a block diagram showing an embodiment of reproducing apparatus in accordance with this invention.

FIG. 4 shows an example of a reproducing system 20. In FIG. 4, to a terminal 21 is supplied the reproduced video signal $S_V'$. This reproduced video signal $S_V'$ is supplied to an A/D converter 22 and a clock generator 23. The video signal $S_V'$ is converted in the form of analog to digital signal in response to the clock CK generated by the clock generator 23. The output from the A/D converter 22 is supplied to a memory 24 in which only the image portion thereof is written in the same way as in the recording mode. The video component read out from the memory 24 is converted in the form of digital to analog signal by a D/A converter 25 and then mixed with an analog composite synchronizing signal $P_{comp}$ from a synchronizing signal generator 27 and a burst signal $S_B$ from a burst signal generator 28 in a synthesizer or composer 26 to thereby reproduce a video signal (composite video signal) $S_V$.

As the composite synchronizing signal $P_{comp}$ and the burst signal $S_B$, there can be used data stored in the memory similarly to the recording mode. In this case, however, the data having the timebase expanded to be the original one is stored in a memory (not shown).

While in the above embodiment the two-segment recording system is exemplified, the number of segments is not limited to "2". In the case of, for example, three-segment recording system, if the diameter of the drum is selected to be D/2 and the rotating frequency is raised three times, the above recording system becomes suitable for recording the video signals of the PAL system and SECAM system.

As set forth above, according to the present invention, since the video signal can be recorded without utilizing the auxiliary head, the picture quality of the reproduced picture is never deteriorated. Moreover, in the present invention, although the timebase of the signal is compressed in the result, the compressed data is read out by using the same clock so that a video signal in which the interval except the video interval, namely, only the horizontal synchronizing interval or only the horizontal synchronizing interval and the vertical blanking interval are compressed in timebase can be obtained. Thus, unlike the conventional apparatus, the recording apparatus of the present invention does not employ a plurality of different clocks so that it has various characteristics; the hardware thereof becomes simple; the interference is never caused among the clocks used therefor; the picture quality is never deteriorated by the undesired component due to the interference; and since the video band is not compressed in timebase, the recording band is never required to be widened.

Furthermore, according to the present invention, since the video signal can be recorded without causing the vertical blanking signal to be dropped out, the time code signal and the like inserted into the vertical blanking interval can be recorded fully without being dropped out.

What is claimed is:

1. An apparatus for recording a video signal on magnetic tape which is helically wrapped on a guide drum having a single rotary head for scanning successive recording tracks on said magnetic tape, the head contacting the tape during an interval in each revolution of the head and being out of contact with the tape during the remainder of each revolution, the apparatus comprising:
   means for dividing each field of said video signal into N segments, where N is a positive integer greater than one, and time-compressing each of said N segments so that each of said segments corresponds to said interval during which said single rotary head contacts said magnetic tape in each revolution; and
   means whereby said single rotary head sequentially and respectively records said N segments on N recording tracks on said magnetic tape.

2. An apparatus according to claim 1, in which said video signal includes a synchronizing signal interval, and in which said time-compressing means includes control means for time-compressing said synchronizing signal interval of said video signal.

3. An apparatus according to claim 2, in which said control means comprises first memory means for writing only a video signal interval of said video signal therein and reading said video signal interval therefrom, second memory means for storing the time-compressed synchronizing signal interval; and switch means for alternatively reading said video signal interval from said first memory means and said synchronizing signal interval from said second memory means.

4. An apparatus according to claim 3, in which said second memory means comprises a first read only memory storing a horizontal synchronizing signal interval and a second read only memory storing a vertical synchronizing signal interval.

5. An apparatus according to claim 3, further comprising a clock signal generator connected with said first memory means for generating a clock signal which is used for writing and reading of said first memory means.

6. An apparatus for recording and reproducing a video signal on a magnetic tape, comprising:
   a single rotary head for scanning successive recording tracks on said magnetic tape, said head contacting said tape for a predetermined interval in each revolution and being out of contact with the tape during the remainder of each revolution;
   first processing means for dividing each field of said video signal into N segments, where N is a positive integer greater than 1, and time-base compressing each of said segments to form compressed segment signals each corresponding, in time, to said predetermined interval when said head contacts said tape;
   means whereby said single rotary head sequentially and respectively records said compressed segment signal on N of said tracks on said tape;
   means for reproducing said compressed segment signals by said head; and
   second processing means for time-base expanding the reproduced compressed segment signals so as to reproduce said video signal.

7. The apparatus of claim 6; wherein said video signal includes a synchronizing signal interval portion; and wherein said first processing means includes control means for time-base compressing said synchronizing signal interval portion of said video signal.

8. The apparatus of claim 7; wherein said control means includes:
   first memory means for storing said video signal without said synchronizing signal interval portion;
   second memory means for storing the time-base compressed synchronizing signal interval portion of said video signal; and
   switch means for alternately supplying one of said video signal from said first memory means and said time-base compressed synchronizing signal interval portion from said second memory means.

9. The apparatus of claim 6; wherein said second processing means includes:
   analog to digital converting means for converting said compressed segment signals to a digital signal;
   memory means responsive to read and write signals for storing said digital signal from said converting means;
   digital to analog converting means for receiving said digital signal from said memory means and converting the same to an analog signal; and
   clock means for timing said read and write signals supplied to said memory means so that said compressed segment signals are time-base expanded to the original time base.

10. The apparatus of claim 9; further comprising:
    means for generating a synchronizing signal; and
    means for inserting said synchronizing signal into said analog signal.

11. The apparatus of claim 10; further comprising:
    means for generating a burst signal; and
    means for supplying said burst signal to said means for inserting whereby said burst signal is also inserted into said analog signal.

12. The apparatus of claim 6; wherein said video signal includes a horizontal synchronizing pulse; and wherein said first processing means includes control means for time-base compressing said horizontal synchronizing pulse.

13. The apparatus of claim 12; wherein said video signal includes a vertical synchronizing pulse; and wherein said control means also time-base compresses said vertical synchronizing pulse.

* * * * *